(12) United States Patent
Stein et al.

(10) Patent No.: US 7,580,450 B2
(45) Date of Patent: Aug. 25, 2009

(54) PARAMETER ESTIMATOR WITH DYNAMICALLY VARIABLE INTEGRATION TIME

(75) Inventors: Jeremy M. Stein, Haifa (IL); Ivan Fernandez-Corbaton, San Diego, CA (US); Roland R. Rick, San Diego, CA (US); Borislav Ristic, San Diego, CA (US); Ashok Bhatia, San Diego, CA (US); Messay Amerga, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 11/501,451

(22) Filed: Aug. 8, 2006

(65) Prior Publication Data

US 2006/0274823 A1 Dec. 7, 2006

Related U.S. Application Data

(63) Continuation of application No. 10/057,689, filed on Jan. 24, 2002.

(60) Provisional application No. 60/335,063, filed on Oct. 29, 2001.

(51) Int. Cl.
*H04B 1/00* (2006.01)
*H04L 27/06* (2006.01)

(52) U.S. Cl. ........................ 375/150; 375/343

(58) Field of Classification Search ................ 375/150, 375/147, 130, 140, 343
See application file for complete search history.

(56) References Cited

U.S. PATENT DOCUMENTS

| | | | | |
|---|---|---|---|---|
| 3,810,082 A | * | 5/1974 | Arens | 367/122 |
| 4,387,465 A | * | 6/1983 | Becker | 375/130 |
| 4,809,005 A | * | 2/1989 | Counselman, III | 342/352 |
| 5,027,148 A | * | 6/1991 | Anagnostopoulos | 396/96 |
| 5,608,703 A | * | 3/1997 | Washisu | 348/208.7 |
| 5,644,591 A | * | 7/1997 | Sutton | 375/142 |
| 5,703,597 A | | 12/1997 | Yu et al. | |
| 5,790,589 A | * | 8/1998 | Hutchison et al. | 375/149 |
| 5,872,774 A | | 2/1999 | Wheatley, III et al. | |
| 5,872,776 A | * | 2/1999 | Yang | 370/342 |

(Continued)

FOREIGN PATENT DOCUMENTS

EP   1083440 A2   3/2001

(Continued)

OTHER PUBLICATIONS

International Search Report- PCT/US02/34805- International Search Authority/EPO- Jul. 4, 2003 (3 pages).

(Continued)

*Primary Examiner*—Temesghen Ghebretinsae
(74) *Attorney, Agent, or Firm*—Andrea L. Mays; Shyam K. Parekh

(57) ABSTRACT

A parameter estimator for estimating one or more parameter(s) from a correlation function derived from a signal using a dynamically variable integration time is described. The parameter estimator may be employed in a subscriber station to estimate the time of arrival of one or more base station or sector pilot signals in a wireless communication system. This information may be utilized in an overall advanced forward link trilateration (AFLT) process for estimating the location of the subscriber station.

39 Claims, 13 Drawing Sheets

U.S. PATENT DOCUMENTS

| | | | |
|---|---|---|---|
| 6,044,104 A | 3/2000 | Watanabe | |
| 6,133,873 A | 10/2000 | Krasner | |
| 6,204,812 B1* | 3/2001 | Fattouche | 342/457 |
| 6,208,297 B1 | 3/2001 | Fattouche et al. | |
| 6,229,842 B1 | 5/2001 | Schulit et al. | |
| 6,266,014 B1 | 7/2001 | Fattouche et al. | |
| 6,324,210 B1 | 11/2001 | Yang et al. | |
| 6,341,140 B1* | 1/2002 | Lee et al. | 375/130 |
| 6,379,013 B1* | 4/2002 | Bechtel et al. | 359/604 |
| 6,477,162 B1* | 11/2002 | Bayley et al. | 370/342 |
| 6,493,378 B1 | 12/2002 | Zhodzishsky et al. | |
| 6,507,571 B1 | 1/2003 | Yamamoto | |
| 6,519,277 B2 | 2/2003 | Eidson | |
| 6,687,507 B2 | 2/2004 | Fischer et al. | |
| 6,738,438 B2* | 5/2004 | Rick et al. | 375/343 |
| 6,756,940 B2 | 6/2004 | Oh et al. | |
| 6,785,321 B1 | 8/2004 | Yang et al. | |
| 6,836,518 B1 | 12/2004 | Sano et al. | |
| 6,865,395 B2* | 3/2005 | Riley | 455/456.1 |
| 6,973,119 B2 | 12/2005 | Yotsumoto et al. | |
| 7,006,556 B2 | 2/2006 | Abraham et al. | |
| 7,308,022 B2 | 12/2007 | Rick et al. | |
| 2001/0009562 A1* | 7/2001 | Ohno | 375/148 |
| 2002/0115448 A1* | 8/2002 | Amerga et al. | 455/456 |
| 2003/0081661 A1* | 5/2003 | Stein et al. | 375/150 |
| 2003/0087604 A1 | 5/2003 | Stein et al. | |

FOREIGN PATENT DOCUMENTS

| | | |
|---|---|---|
| WO | 0045191 | 8/2000 |
| WO | 0054424 | 9/2000 |
| WO | 0070792 | 11/2000 |
| WO | 0176092 A2 | 10/2001 |
| WO | 03039020 | 5/2003 |
| WO | 03039021 | 5/2003 |
| WO | 03038467 | 8/2003 |

OTHER PUBLICATIONS

Bar-David, et al., "Barker Code Position Modulation for High-rate Communication in the ISM Bands", Bell Labs Technical Journal Autumn 96 pgs. 21-40et al., "Barker Code Position Modulation for High-rate Communication in the ISM Bands", Bell Labs Technical Journal Autumn 96 pgs. 21-40avid, et al., "Barker Code Position Modulation for High-rate Communication in the ISM Bands", Bell Labs Technical Journal Autumn 96 pp. 21-40.

Iinatti, J., "DS Code Acquisition is Slowly Fading Multi-path Channel" IEEE - University of Oulu, Telecommunications Laboratory 2000 pp. 2408-2413.

Iinatti, J.,"On the Threshold Setting Principles in Code Acquisiton of DS-SS Signals", IEEE Journal on Selected Areas in communication vol. 18, No. 1, Jan. 2000, pp. 52-72.

International Preliminary Examination Report, PCT/US2002/034805 - International Preliminary Examining Authority- US - Oct. 12, 2005.

* cited by examiner

PARAMETER ESTIMATOR WITH DYNAMICALLY VARIABLE INTEGRATION TIME

RELATED APPLICATION

This application in a continuation of U.S. patent application Ser. No. 10/057,689, filed on Jan. 24, 2002, which claims priority to U.S. Provisional Application No. 60/335,063, filed on Oct. 29, 2001.

FIELD OF THE INVENTION

This invention relates to the field of parameter estimation using correlation analysis, and more specifically, to a parameter estimator employing correlation analysis for estimating parameter(s) of signals subject to distortions caused by factors such as multi-path.

RELATED ART

The Global Positioning System (GPS) is a collection of satellites each of which travels in a precise orbit above the earth's surface. Each satellite transmits a signal modulated with a pseudo-noise (PN) code unique to the satellite. Each PN code comprises a predetermined number of chips. A GPS receiver receives a composite signal comprising a mixture of signals from each of the satellites that are visible to the receiver. A signal detector in the receiver detects a transmission from a particular satellite by determining the degree of correlation between the received signal and shifted versions of the PN code for that satellite. If a peak of sufficient quality in the correlation value for one of the shift offsets is detected, the receiver is considered to have detected the transmission from the satellite.

The receiver estimates its location by detecting transmissions from at least four of the satellites. For each detected transmission, the receiver uses the shift in the PN code to estimate the delay (in terms of chips or fractions of chips) between time of transmission and time of arrival. Given the known velocity of the transmission, the receiver estimates the distance between itself and the satellite. This estimated distance defines a sphere around the satellite. The receiver knows the precise orbits and positions of each of the satellites, and continuously receives updates to these orbits and positions. From this information, the receiver is able to determine its position (and the current time) from the point where the spheres for the four satellites intersect.

The FCC has mandated that subscriber stations, including but not limited to mobile stations, in wireless communications systems be capable of estimating their locations in order to promote rapid responses to 911 and other emergency calls. In response to this mandate, efforts are underway to equip subscriber stations with the means to estimate their locations from GPS satellite transmissions. Moreover, since base stations or sectors in wireless communications systems transmit pilot signals modulated with unique PN codes, these efforts also include allowing subscriber stations to estimate their locations from the transmissions of multiple base stations or sectors, or combinations of base stations or sectors and GPS satellites.

A signal detector in a GPS receiver attempts to detect the transmission from a satellite by a peak of a function derived by multiplying the received signal (which is typically a composite signal comprising a mixture of the transmissions from multiple satellites) with shifted versions of the PN code for the satellite, and then, for each shifted PN code, adding the multiplied values over a predetermined integration time to achieve a value representative of the degree of correlation between the received signal and the shifted PN code.

However, such a detector is not generally effective for the purpose of detecting transmissions from multiple base stations or sectors since, unlike the transmissions from GPS satellites, the signals from the base stations or sectors typically vary widely in quality due to distortions caused by factors such as multi-path, lack of line of sight, network layout (which typically intend that only one base station or sector be visible at a time to a mobile), and dynamic network conditions. Consequently, the detector will typically either saturate while attempting to detect the highest quality signals (if the integration time is set too long), exceed available search time constraints (again if the integration time is set too long), or be unable to detect the lowest quality signals (if the integration time is set too short).

Consider, for example, a detector which attempts to detect 40 different base station or sector signals, and evaluate 400 different PN code offsets for each base station or sector signal. If the detector employs a relatively long integration time, e.g., 26.67 mS, so it can detect the weakest signals, even assuming it can evaluate 16 offsets simultaneously, the detector will require 26.67 seconds to perform the search, which is prohibitive given what are typical time constraints of 2-4 seconds.

RELATED APPLICATIONS

This application is related to U.S. Pat. No. 6,738,438, and U.S. patent application Ser. Nos. 10/060,885 and 10/125,182. Qualcomm Dkt. Nos. 010375, 010376, and 010378, filed on even date herewith, and owned in common by the assignee hereof. These applications are each fully incorporated by reference herein as though set forth in full.

SUMMARY

The invention provides a parameter estimator for estimating one or more parameter(s) of a signal through correlation analysis using a dynamically variable integration time. For purposes of this disclosure, a dynamically variable integration time is one which can vary from signal to signal, or from estimation attempt to estimation attempt for a particular signal, or based on a priori information regarding the signal, or which can vary responsive to a preliminary analysis performed on the signal, or any combination of the foregoing. The signal may be a standalone signal or part of a composite signal comprising multiple signals. Examples of the parameter(s) which may be estimated include, but are not limited to, time of arrival (TOA), root mean squared error (RMSE) for the TOA estimate, energy per chip ($E_c$) divided by interference noise density ($I_0$), etc.

The estimator comprises correlation logic and analysis logic. The correlation logic determines a correlation function of a signal in relation to a selected identification code which, in one embodiment, is a PN code. The correlation function represents the correlation between the signal and shifted versions of the identification code. The analysis logic analyzes the correlation function for the signal and, responsive thereto, estimates one or more parameter(s) for the signal.

Various methods of operating the estimator are possible. In one embodiment, the estimator estimates one or more parameter(s) of a first signal using a first integration time, and then estimates one or more parameter(s) of a second signal using a second integration time which may differ from the first. If the second signal is stronger than the first, the second integration time may be smaller than the first. If the second signal is weaker than the first, the second integration time may be greater than the first.

In a second embodiment, the estimator first attempts to estimate one or more parameter(s) of a signal using a first integration time. In one implementation, this first integration time is selected so that the strongest signals register towards the upper limit of the dynamic range of the estimator. If successful, the estimator may record the one or more parameter(s). If unsuccessful, the estimator attempts to estimate the one or more parameter(s) using a second integration time which may differ from the first. If the first effort failed because the signal was too weak, or the estimator failed to estimate the parameter(s) with a sufficient level of confidence, the second integration time may be greater than the first. If the first effort failed because the estimator saturated, the second integration time may be shorter than the first.

In a third embodiment, the estimator first conducts a preliminary analysis of a signal, and responsive thereto, determines an integration time for the signal. The estimator then attempts to estimate one or more parameter(s) of the signal using this integration time.

When the technique represented by any of these embodiments is applied to a group of signals during a search cycle, performance is improved compared to the signal detector for a GPS receiver, since the strongest signals are not subject to the greater integration times needed to successfully detect weaker signals. Therefore, search cycle time and the incidence of saturation is reduced.

The technique may readily be extended to situations involving more than two integration times, more than two signals, and to more than two passes in a search cycle for a particular signal.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION

Example Application

Figure 1:
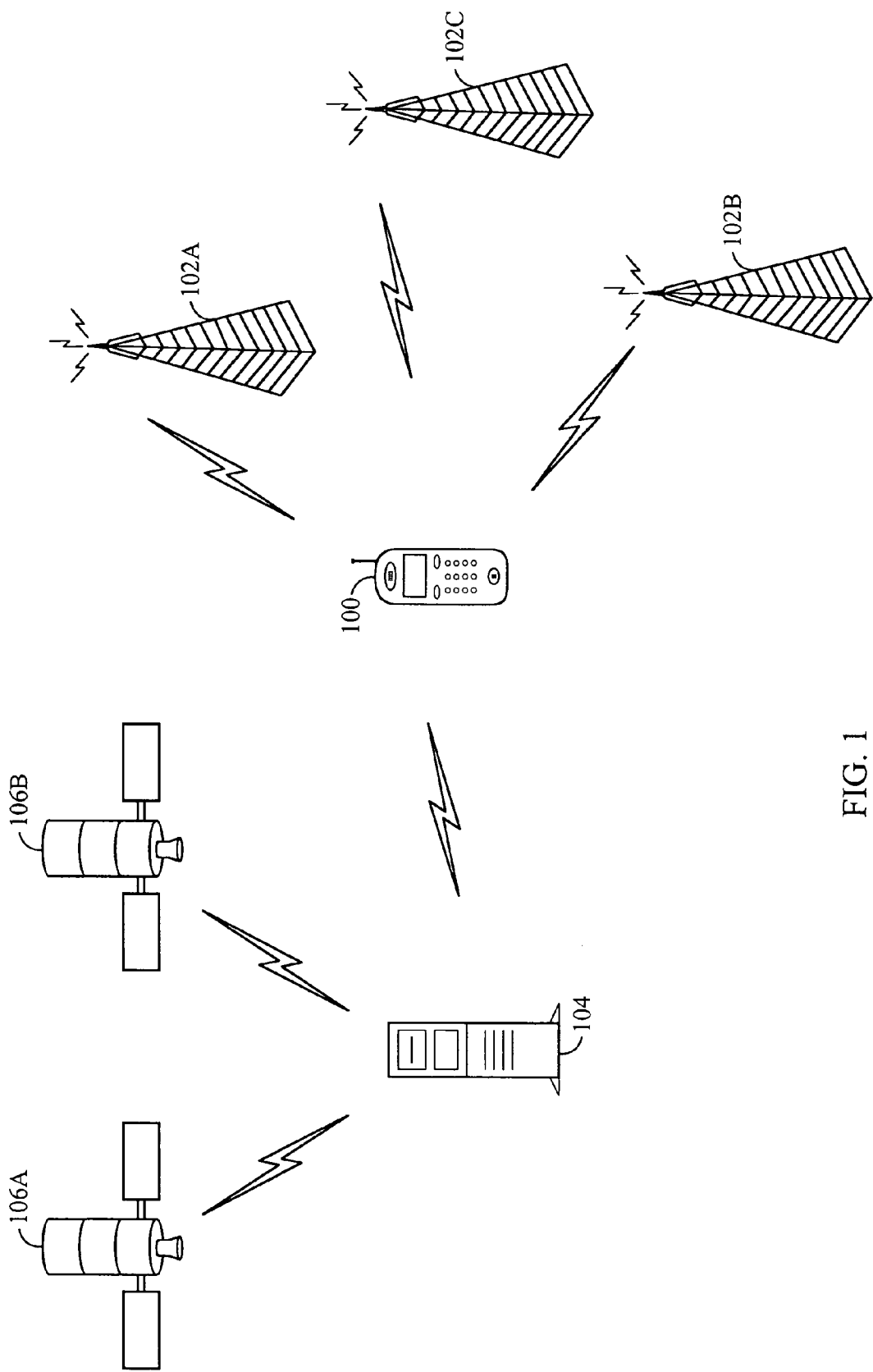
FIG. 1 is an example application of a parameter estimator according to the invention.

Referring to FIG. 1, an example application of a parameter estimator according to the invention is illustrated. In this example application, the parameter estimator is employed within subscriber station 100 for the purpose of determining its location. The subscriber station 100 is a component of a wireless communication system such as but not limited to cellular, fixed wireless, PCS, and satellite communications systems. Moreover, the wireless communications system may provide for multiple access in accordance with CDMA, TDMA, FDMA, or GSM multiple access protocols, or combinations thereof.

One or more base stations or sectors 102a, 102b, and 102c are employed in the wireless communications system. Each base station or sector 102a, 102b, 102c transmits a pilot signal which is modulated with a repeating pseudo-random noise (PN) code which uniquely identifies that base station or sector. For IS-95 compliant CDMA systems, the PN code is a sequence of 32,768 chips which is repeated every 26.67 mSec.

One or more GPS satellites 106a, 106b may also be visible to the subscriber station 100 or position determination entity (PDE) 104. Each of the GPS satellites also transmits a signal which is modulated with a repeating PN code which uniquely identifies that satellite. In current GPS systems, the PN code is a sequence of 1,023 chips which is repeated every millisecond.

The parameter estimator within subscriber station 100 is configured to estimate various parameters of the pilot signals transmitted from the base stations or sectors 102a, 102b, and 102c and/or the signals transmitted from the GPS satellites 106a, 106b. Such parameters may include TOA, time of transmission, energy per chip divided by interference power density ($E_c/I_0$), root mean squared error (RMSE) associated with the TOA estimate, etc.

These parameters, once estimated, are provided to PDE 104 which estimates the location of subscriber station 100 responsive thereto. (The PDE 104 may be a sever in a computer network including a public network such as the Internet or other TCP/IP network, or a private network.) Once estimated, the position of the subscriber station 100 is downloaded to it so that it is available from the subscriber station 100 in the event of a 911 or other emergency call.

The PDE 104 may estimate the location of the subscriber station 100 from the measurements relating to the base stations or sectors 102a, 102b, and 102c, or, to increase accuracy, from the combined measurements of one or more of the base station(s) or sector(s) 102a, 102b, 102c and one or more of the GPS satellite(s) 106a, 106b.

The PDE 104 may provide other forms of assistance to the subscriber station 100. For example, PDE 104 may continuously track the GPS satellites, and provide assistance to the subscriber station 100 in locating the signals transmitted from the GPS satellites 106a, 106b. This avoids the need to have the subscriber station 100 undergo time-consuming "cold start" procedures for locating the satellites when it is powered up.

It should be appreciated that many other applications of the parameter estimator of the invention are possible, so this example should not be taken as limiting.

EMBODIMENTS OF THE INVENTION

Figure 2A:
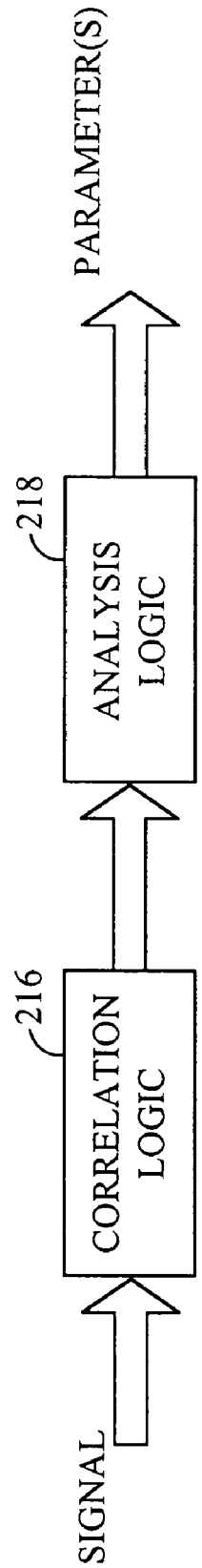
FIG. 2A is a simplified block diagram of one embodiment of a parameter estimator according to the invention.

Referring to FIG. 2A, a block diagram of one embodiment of a parameter estimator according to the invention is illustrated. A signal is input to correlation logic 216. The signal may be a standalone signal or part of a composite signal comprising multiple signals. In one application, the signal is a pilot signal from a base station or sector in a wireless communications system and is part of a composite signal representing the transmissions from multiple base stations or sectors. The signal from each base station or sector is modulated with a identification code which, in one example, is a PN code. The identification code may be modulated onto the signal on a one-time or repeating basis.

Correlation logic 216 is configured to determine, using a dynamically variable integration time, the correlation between the signal and shifted versions of an identification code. Obviously, the greatest degree of correlation will be exhibited if the identification code used by the correlation logic 216 matches that modulated onto the signal. The correlation logic 216 outputs a correlation function which represents the correlation between the signal and shifted versions of the identification code. This correlation function is input to analysis logic 218. Analysis logic 218 analyzes this correlation function and, responsive thereto, estimates one or more parameter(s) relating to the signal.

For purposes of this disclosure, the term "logic" means hardware, software, or a combination of hardware and software, and the phrase "dynamically variable integration time" is one which can vary from signal to signal, or from estimation attempt to estimation attempt for a particular signal, or based on a priori information regarding the signal, or which can vary responsive to a preliminary analysis performed on the signal, or any combination of the foregoing.

Figure 2B:
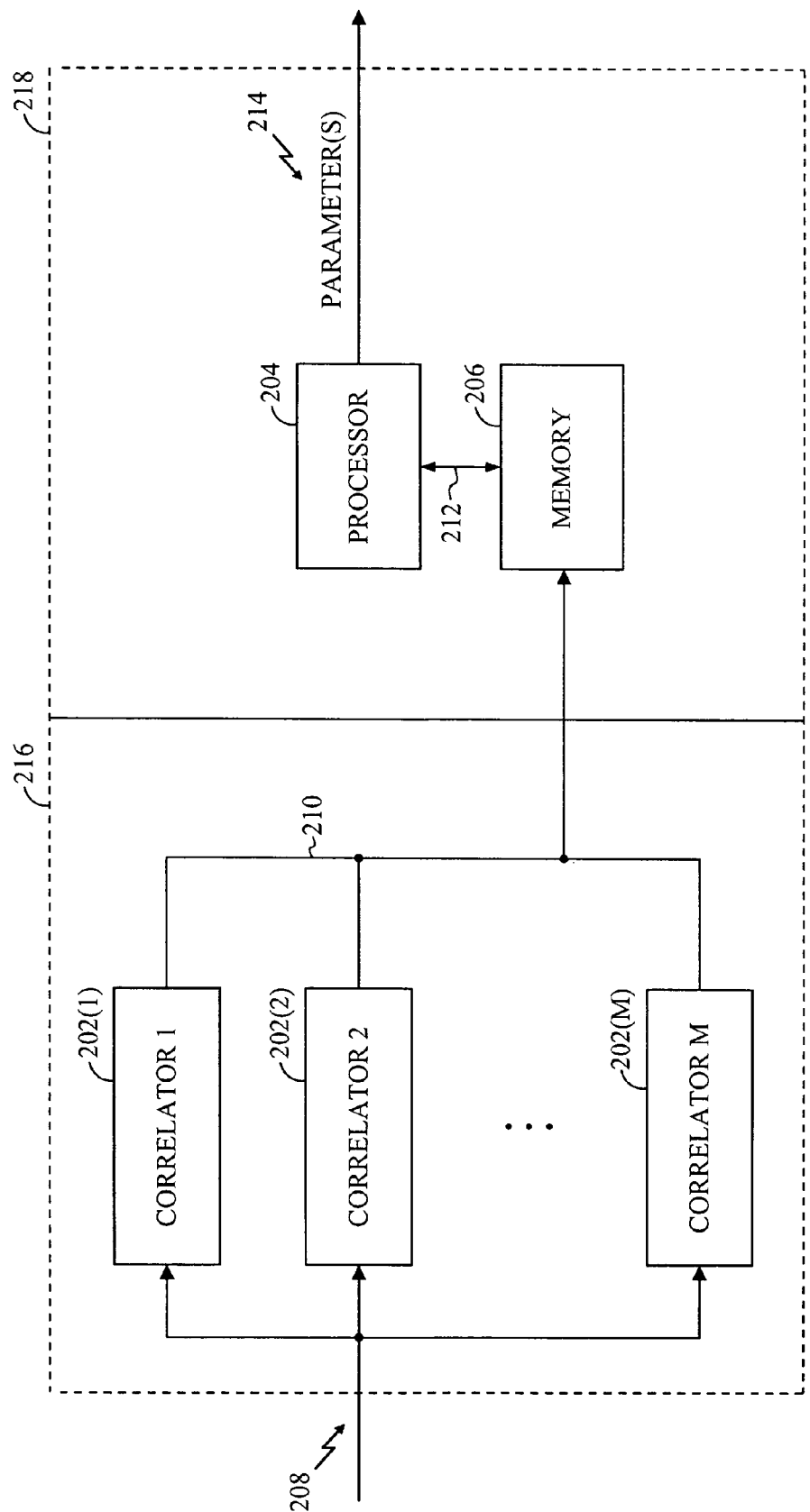
FIG. 2B is a simplified block diagram of one implementation of a parameter estimator according to the invention.

Referring to FIG. 2B, a block diagram of a second embodiment of a parameter estimator according to the invention is illustrated. A signal S is input in parallel to each of R correlators 202(1), 202(2), ..., 202(R), where R is an integer of one or more, over one or more signal line(s) 208. Again, the signal S may be a standalone signal or a part of a composite signal. In one implementation example, R is 16. In a second implementation example, R is 256. Each of the R correlators determines, in parallel, using a dynamically variable integration time, a correlation value representing the degree of correlation between a shifted version of a selected PN code and the signal. In one implementation, each of the R correlators operates using a shifted version of the same PN code, with each correlator assigned a different shift value.

In one example, each sample of the signal S is a complex number having in-phase (I) and quadrature (Q) components. In one implementation, a correlation value C, which depends on the PN code and the shift s in the PN code which are used, is coherent, i.e., retains phase information, and is a complex number which can be expressed as follows:

$$C(PN, s) = \sum_{i=k+0}^{k+N-1} PN(i-s) \cdot S(i) \quad (1)$$

where N is the dynamically variable (coherent) integration time in terms of chips, S(i) are samples of the received signal, and k is an arbitrary origin.

In a second implementation, the correlation value C is a real number which is derived by non-coherently, i.e., not retaining phase information, M successive coherent integrations, each conducted over N chips. In this implementation, both N and M may be dynamically variable integration parameters. In this implementation, the correlation value C may be expressed as follows:

$$C(PN, s) = \sum_{i=1}^{M} \sum_{i=k+(j-1)N}^{k+jN-1} |PN(i-s) \cdot S(i)| \quad (2)$$

The range of the shift s that is desired to be tested can be referred to as the search window W. If the number R of correlators is less than the desired window size, W, additional iterations may be performed by the R correlators until W correlation values have been obtained. The W values C(PN, s) output by the correlators together form a correlation function F(PN, s), which represents the degree of correlation between the signal and the shift s of the PN code (where the shift s is expressed in terms of chips) over a desired search window W. In the case where the PN code is repeatedly modulated onto the signal, the correlation function F(PN, s) will be periodic.

Figure 8A:
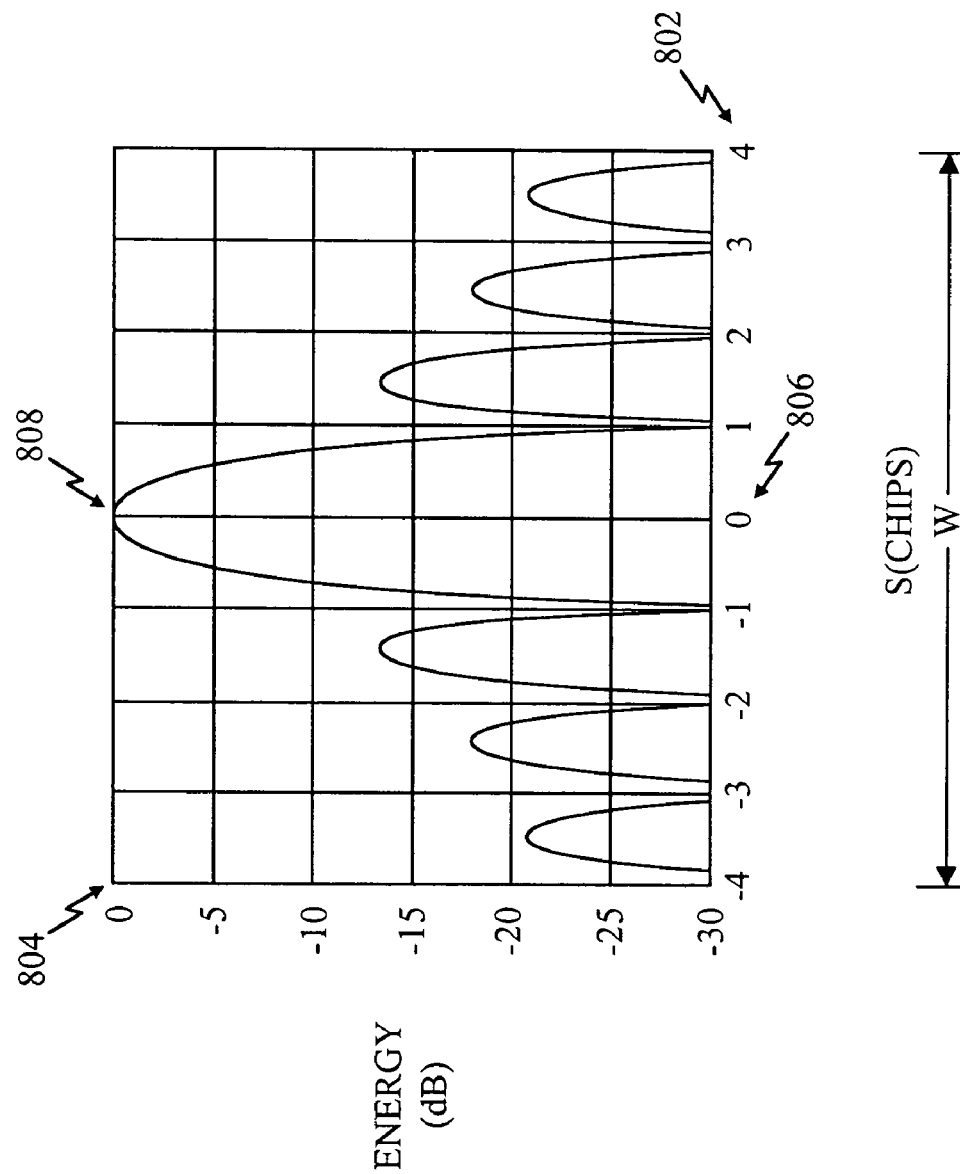
FIG. 8A is a time domain representation of one example of a correlation function for a CDMA pilot signal.

FIG. 8A illustrates an example of one period of a periodic correlation function F(PN, s) for a pilot signal in a CDMA wireless communication system. The window size (in terms of chips) in this example is 8, and the window is assumed to be centered at the origin 806. The horizontal axis 802 represents the shift of the PN code (expressed in terms of chips), and the vertical axis 804 represents the correlation function F(PN, s) (expressed in terms of Energy(dB)). As illustrated, the signal in this example reaches a peak at the origin 806.

Referring back to FIG. 2B, once determined, the function F(PN, s) is output on one or more signal line(s) 210 and stored in memory 206. In like manner, the function F(PN, s) for other PN codes can be determined by the correlators 202(1), 202(2), ..., 202(R), and stored in memory 206.

A processor 204 is configured to retrieve a function F(PN, s) from memory 206 over one or more signal line(s) 212, and attempt to estimate therefrom one or more parameter(s) relating to the signal from which it was derived. In one implementation, the processor 204 attempts to estimate time of arrival (TOA), root mean squared error (RMSE) of the TOA estimate, and energy per chip divided by total interference power density ($E_c/I_0$) for the signal. If the attempt is unsuccessful, the processor 204 may direct the R correlators 202(1), 202(2), ..., 202(R) to re-determine the correlation function F(PN, s) using a different integration time. This process may iterate one or more times until the one or more parameter(s) may be estimated from the correlation function or it is determined that the parameter(s) cannot be estimated. If the one or more parameter(s) can be and are estimated, the processor 204 may be configured to output them over one or more signal line(s) 214.

Figure 8B:
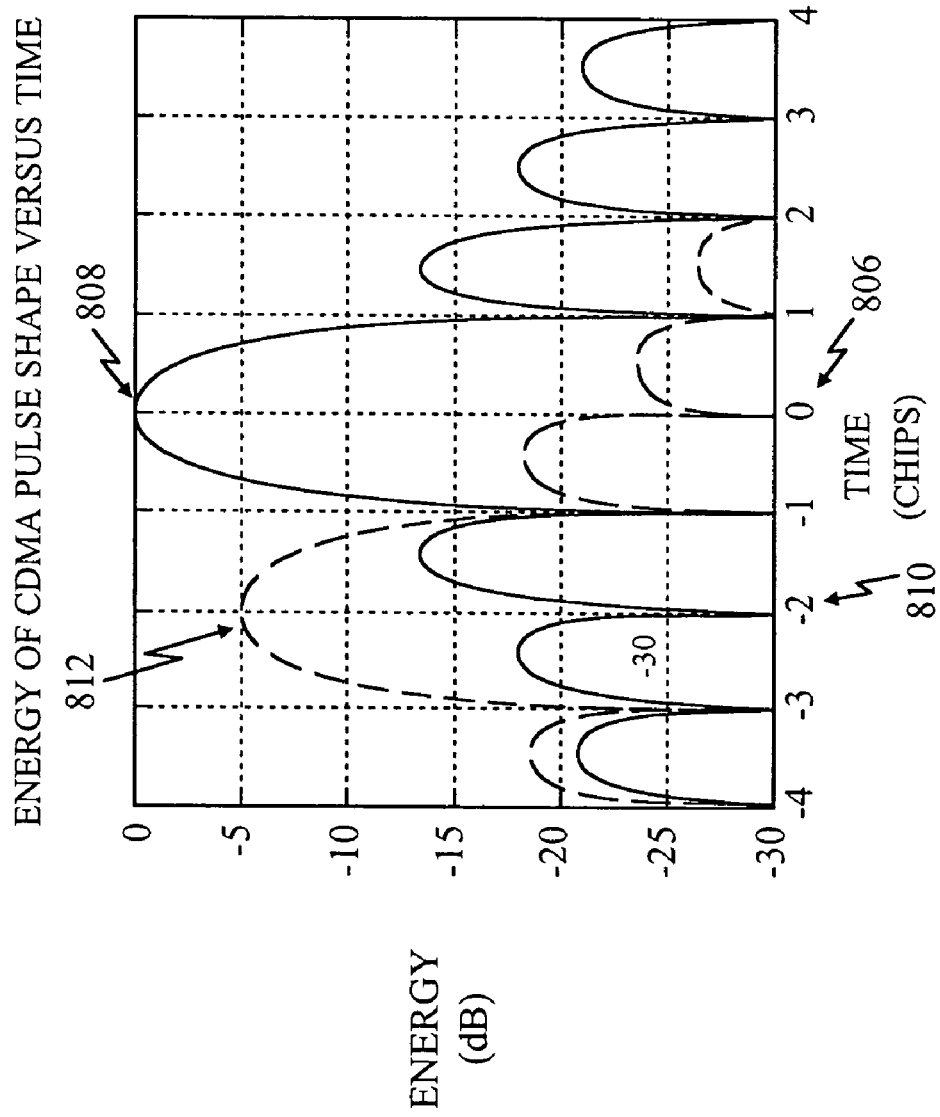
FIG. 8B illustrates direct line-of-sight and reflected renderings of the function of FIG. 8A.

In one implementation, the processor 204 is configured to derive an estimate of the time of arrival of a base station pilot signal from a peak of the function F(PN, s) derived from that pilot signal. Referring to FIG. 8A, the time of arrival can generally be represented by the offset s corresponding to the main peak 808 of the correlation function F(PN, s), which happens to be the origin 806 in the example of FIG. 8A, unless, due to multi-path, there is an earlier-in-time (and weaker) independent arrival which is distinguishable from the sidelobes of the main peak. In this latter case, referring to FIG. 8B, a weaker independent arrival is represented by the function depicted in the figure with a dashed line. In this situation, the offset 810 corresponding to the peak 812 of this earlier-in-time arrival represents the time of arrival of the corresponding pilot in contrast to the offset 806 corresponding to the peak 808 of the stronger but later-in-time arrival. Consequently, to accurately estimate the time of arrival parameter, the processor 204 should detect the earliest peak of the correlation function F(PN, s) that is not a sidelobe.

The energy of the peaks 808, 812 is directly proportional to the integration time used to derive the correlation function. If the integration time is set too low, one or both of the peaks 808, 812 may be indistinguishable from noise and/or sidelobes from other arrivals. If, on the other hand, the integration time is set too high, one or both of the peaks 808, 812 may cause saturation of the estimator. In either case, the time of arrival cannot be accurately estimated. If, however, the integration time is set such that the peaks 808, 812 can be distinguished from noise and/or sidelobes from other arrivals, and do not cause saturation of the estimator, the time of arrival can be accurately estimated.

Figure 8C:
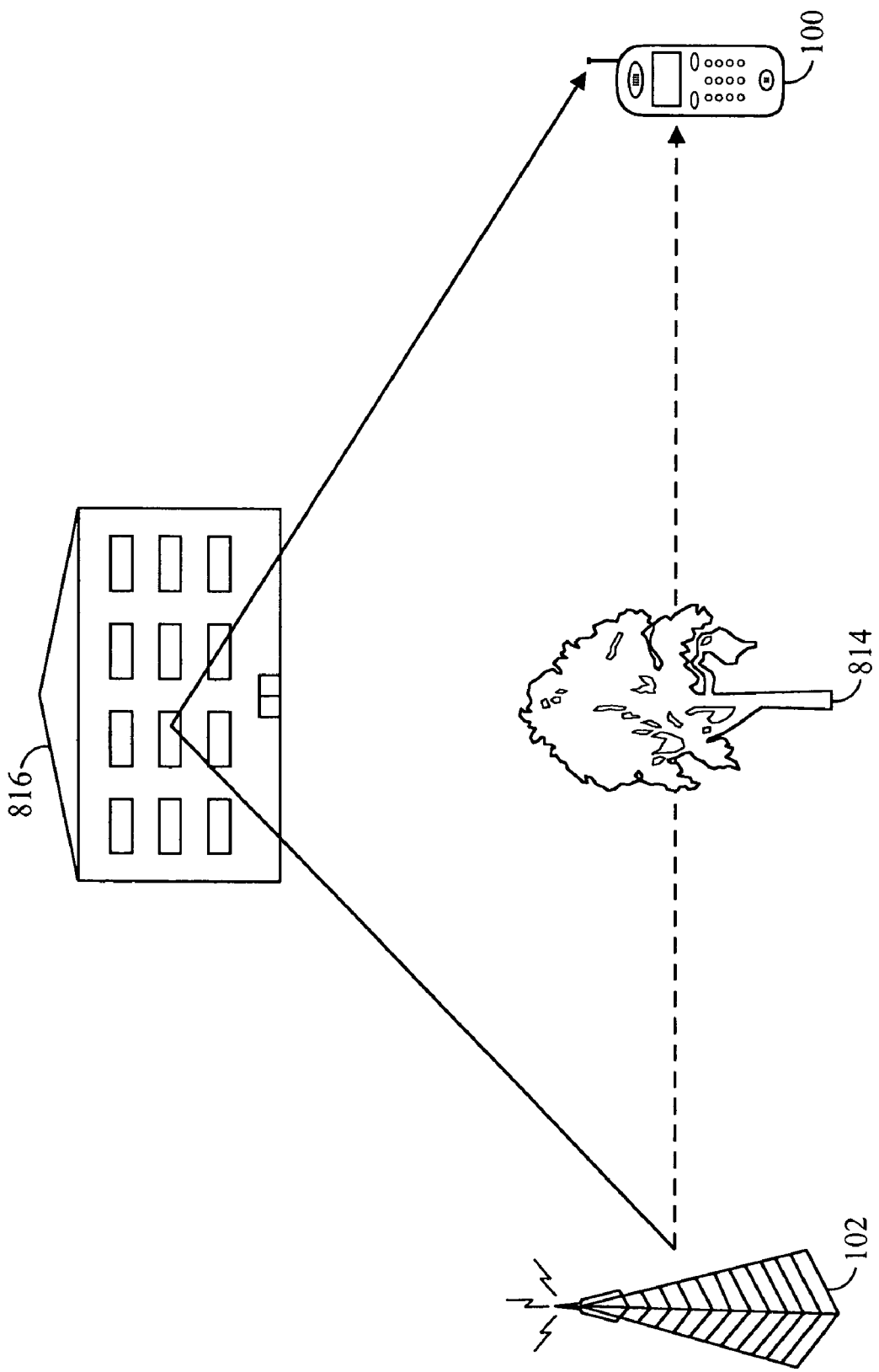
FIG. 8C illustrates direct and indirect arrivals of a pilot signal at a subscriber station due to multi-path.

FIG. 8C depicts an example of a situation where an independent but weaker earlier-in-time arrival might be present. As illustrated, the direct line-of-sight path between base station or sector 102 and subscriber station 100 is blocked by an obstruction 814 (a tree in the example) which attenuates but still allows passage of the pilot signal. At the same time, due to multi-path, the same pilot signal may reflect off of another obstruction 816 (a building in the example) and be received by the subscriber station 100 with less attenuation than the direct line-of-sight arrival. The time of arrival of the pilot should be determined from the weaker direct line-of-sight arrival of the pilot signal (through obstruction 814), and not from the stronger arrival which reflects from obstruction 816. For additional information on a procedure for distinguishing earlier-in-time peaks from the sidelobes for the later-in-time signal, please see U.S. Patent Application Ser. No. 10/060,885, filed on even date herewith, which is hereby fully incorporated by reference herein as though set forth in full.

Referring back to FIG. 2B, the processor 204 may be any device capable of executing a series of instructions embodying a process, including but not limited to a computer, microprocessor, an ASIC, finite state machine, DSP, or some other mechanism.

In addition, the memory 206 may be any device readable by a processor and capable of storing a series of instructions embodying a process, including but not limited to RAM, ROM, EPROM, EEPROM, PROM, disk (hard or floppy), CD-ROM, DVD, flash memory, etc.

Figure 3A:
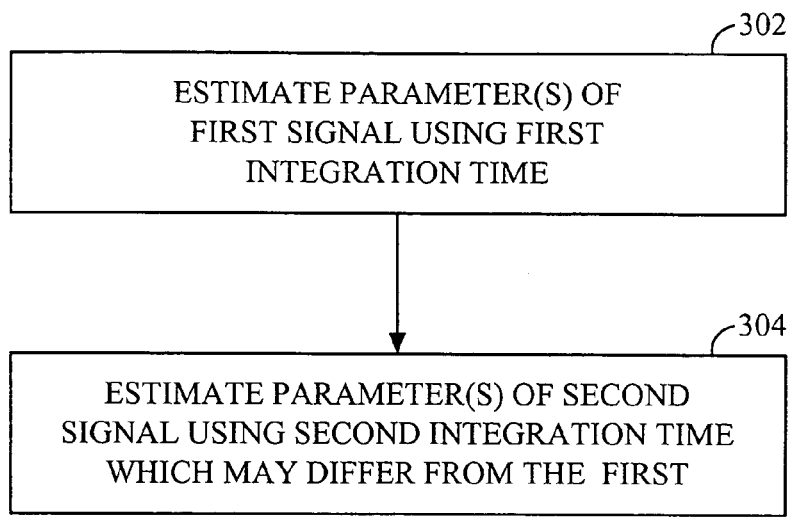
FIGS. 3A-3C are flowcharts of embodiments of methods, according to the invention, of estimating one or more parameter(s) of a signal using a dynamically variable integration time.

Referring to FIG. 3A, a flowchart of one embodiment of a method of estimating one or more parameter(s) of a signal using a dynamically variable integration time is illustrated. The method begins with step 302, which comprises estimating one or more parameter(s) of a first signal from a correlation function derived using a first integration time. The method proceeds to step 304, which comprises estimating one or more parameter(s) of a second signal from a correlation function derived using a second integration time which may differ or vary from the first. The second integration time may be smaller than the first if, for example, the peak energy of the correlation function derived from the second signal is greater than that of correlation function derived from the first signal, and the smaller integration time is needed to avoid saturation of the estimator. Alternatively, the second integration time may be greater than the first if, for example, the peak energy of the correlation function derived from the second signal is weaker than that of the correlation function derived from the first signal, and the greater integration time is needed to allow detection of the signal.

Figure 3B:
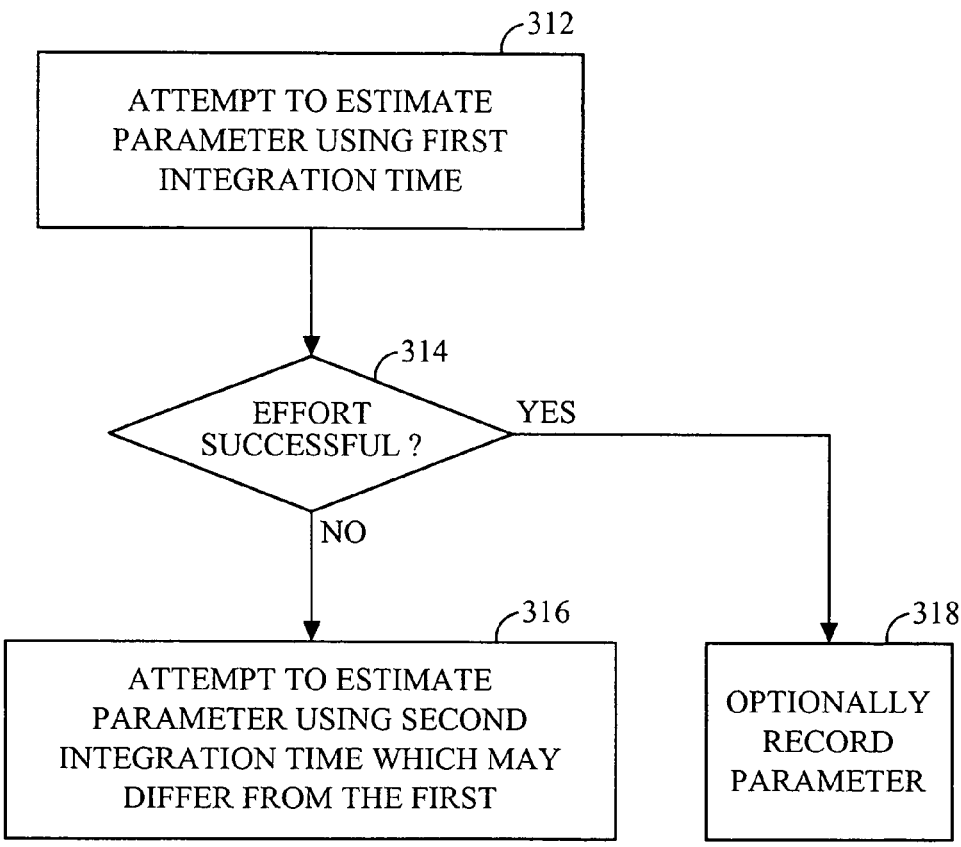

Referring to FIG. 3B, a second embodiment of a method of estimating one or more parameter(s) of a signal using a dynamically variable integration time is illustrated. This embodiment begins with step 312, which comprises attempting to estimate one or more parameter(s) of a signal from a correlation function derived using a first integration time. In one implementation, this first integration time is selected so that the strongest signals register towards the upper limit of the dynamic range of the parameter estimator.

Step 312 is followed by step 314. In step 314, it is determined whether the estimation attempt 312 was successful or not. If so, the one or more parameter(s) may be recorded in a memory as indicated by optional step 318. If not, step 316 is performed. In step 316, a second attempt is made to estimate the one or more parameter(s) from a correlation function derived using a second integration time which may differ from the first.

For example, if the first attempt was unsuccessful because the peak energy of the correlation function derived from the signal using the first integration time was too weak to allow estimation of the one or more parameter(s), or to allow estimation of the one or more parameter(s) with a high enough level of confidence, the second integration time may be greater than the first. But, if the first attempt was unsuccessful because the peak energy of the correlation function derived from the signal using the first integration time was so strong that the estimator saturated, the second integration time may be shorter than the first.

From step 316, the method may continue iterating until the one or more parameter(s) are estimated, or it is determined that these parameter(s) cannot be estimated from the signal.

Figure 3C:
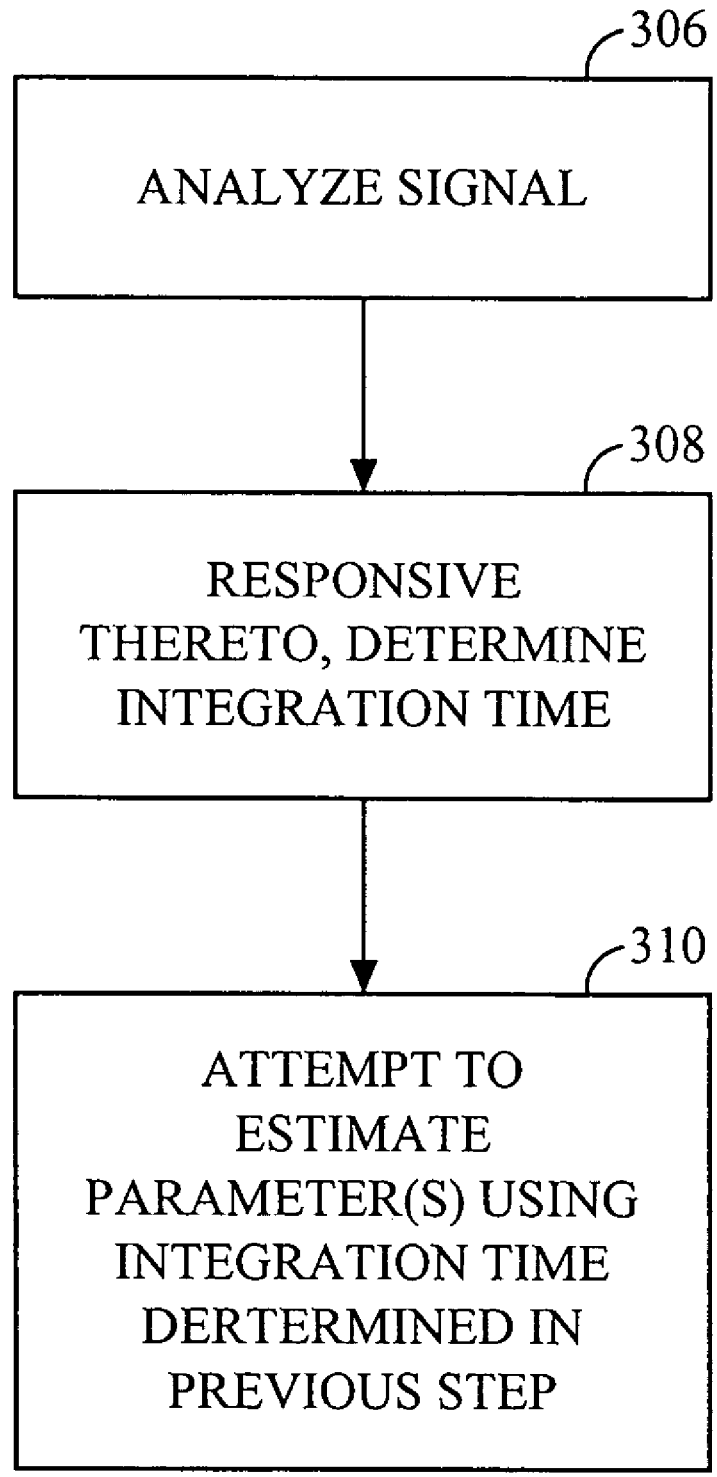

Referring to FIG. 3C, a third embodiment of a method of estimating one or more parameter(s) of a signal using a dynamically variable integration time is illustrated. The method begins with step 306, which comprises conducting a preliminary analysis of the signal in order to determine an appropriate integration time. In one implementation, this step comprises determining the energy of the strongest peak of a correlation function derived from the signal using a default integration time.

The method proceeds to step 308, which comprises determining an integration time for the signal responsive to the analysis performed in step 306. In one implementation, this step comprises selecting an integration time which is smaller than the default value if step 306 indicates that the strongest peak of the correlation function derived using the default integration time causes saturation of the estimator, or selecting an integration time which is greater than the default value if step 306 indicates that the strongest peak of the correlation function derived using the default integration time is indistinguishable from noise, or is too small to accurately estimate the desired parameters.

Step 310 is then performed. In step 310, an attempt is made to estimate one or more parameter(s) of the signal using the integration time determined in step 308. In one implementation, this step may involve conducting a more extensive analysis of the correlation function derived from the signal than that performed in step 306. For example, to estimate time of arrival, this step might involve an investigation of all peaks of the correlation function derived from the signal to determine a coarse estimate of the location of the earliest peak which is not a sidelobe, whereas step 306 might involve determining a more precise estimate of the location of the peak identified in step 306.

From step 310, the method may iterate one or more times until the one or more parameter(s) are estimated, or it is determined that they cannot be estimated from the signal.

When the technique represented by any of these embodiments is applied to a group of signals, compared to the GPS detection method, performance is greatly improved. In particular, search time and the incidence of saturation is reduced since the strongest signals are not subject to the greater integration times appropriate for weaker signals.

Several examples and implementations of a method of estimating one or more parameter(s) of a signal using a dynamically variable integration time in the context of an overall advanced forward link trilateration (AFLT) process for a CDMA wireless communications system will now be described.

Figure 4:
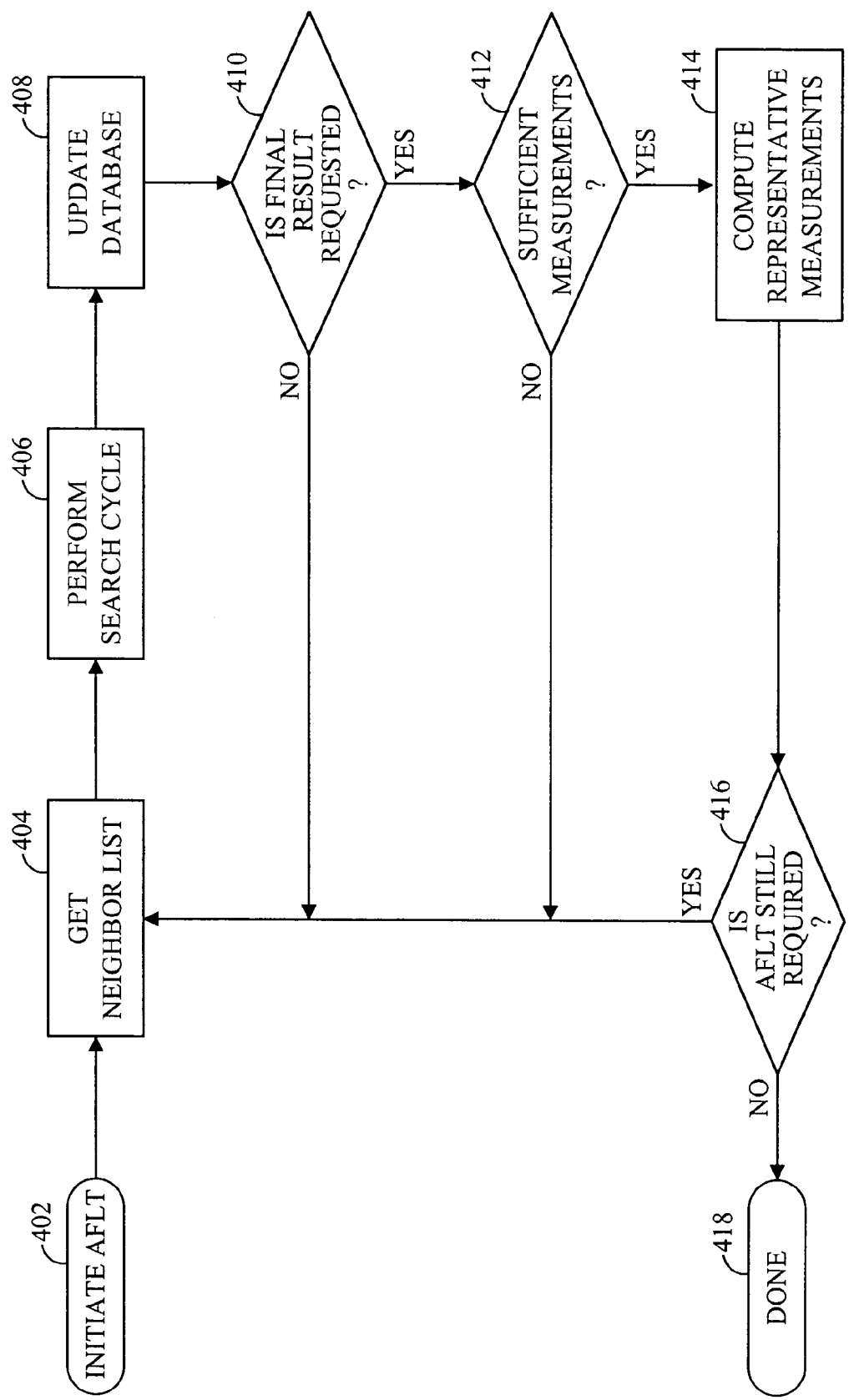
FIG. 4 is a high level flowchart of one implementation of an overall Advanced Forward Link Trilateration (AFLT) process.

Referring to FIG. 4, a flowchart of the overall AFLT process is illustrated. In step 402, the AFLT process is initiated. Control then passes to step 404, where the subscriber station obtains from the active base station, i.e., the base station with which it is currently registered, a list of the neighboring base stations. Step 406 is then performed. In step 406, the subscriber station conducts a search cycle, i.e., it performs a search of the pilots for the listed base stations (as well as the pilot of the active base station). The output of the search cycle is a list of the pilots searched, and for each such pilot, either an indication that the pilot is undetectable, or estimates of one or more parameter(s) relating to the pilot, including but not limited to time of arrival (TOA), a measure of the level of confidence in the TOA estimate, such as a root mean squared error (RMSE), energy per chip divided by total interference power density ($E_c/I_0$), or any combination of the foregoing. Step 408 follows step 406. In step 408, the results of the search cycle are stored in a database.

Step 410 is then performed. In step 410, a determination is made whether a PDE in communication with the subscriber station has requested final results. If not, the method continues to iterate by looping back to step 404. To conserve memory space, the results of the search cycles obtained through these additional iterations may override the earlier recorded results.

If final results have been requested, the method proceeds to step 412, where a determination is made whether sufficient measurements have been obtained to enable the position of the subscriber station to be estimated. In one implementation, this is deemed to occur when TOA measurements having a high level of confidence have been obtained from at least four base stations or sectors. In another implementation, this is deemed to occur when a fixed number of search cycles have been completed. If insufficient measurements have been obtained, the method continues to iterate by looping back to step 404. If sufficient measurements have been obtained, the method proceeds to step 414. In step 414, a single measurement representative of the set of measurements in the database is obtained for each PN and is provided to the PDE. In one implementation, this step is performed by choosing the earliest measurement in the set of measurements, and averaging all of the measurements within a fixed amount of time of the earliest measurement.

Control then passes to step 416, in which the PDE indicates to the subscriber station whether or not AFLT is still required.

If not, control passes to step 418, and the process terminates. If so, control passes to step 404 for another iteration of the method.

Figure 5:
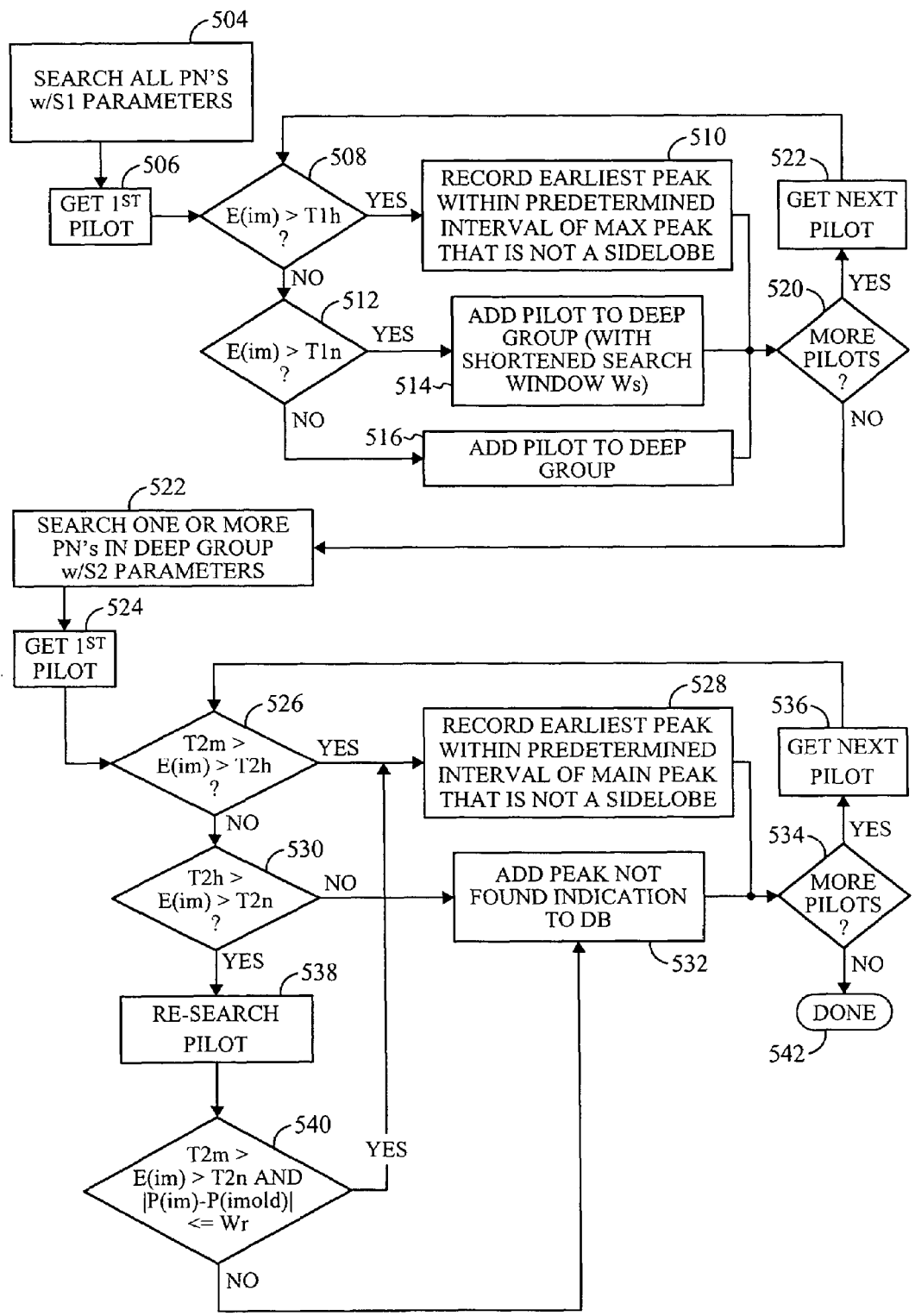
FIG. 5 is a flowchart of one example of a method according to the invention of estimating a time of arrival (TOA) parameter of a CDMA pilot signal using a dynamically variable integration time.

Referring to FIG. 5, a flowchart of one example of a method for performing the search cycle step 406 in FIG. 4 is illustrated. As illustrated, the method begins with step 504, where each of the listed (and active) pilots is "searched" using S1 search parameters, i.e., a correlation function F(PN, s) is obtained for each of the listed neighbor and active PN codes using an integration time specified as part of the S1 search parameters. In one implementation, the S1 search parameters specify a coherent integration time of 1,024 chips and that 4 successive coherent integrations are to be non-coherently combined. (However, other examples are possible, so this example should not be taken as limiting.) This means that each value of the correlation function F(PN, s) is determined by coherently (i.e., retaining phase information) integrating over four successive groups of 1,024 complex samples each, and then non-coherently (i.e., not retaining phase information) combining the results for the four groups. For example, if $I_1$, $Q_1$ represent the real and imaginary parts of the correlation value resulting from coherently integrating over the first 1,024 samples, $I_2$, $Q_2$ represent the real and imaginary parts of the correlation value resulting from coherently integrating over the next 1,024 samples, etc., the correlation value resulting from non-coherently combining these coherent integration results may be expressed as $$\sum_{i=1}^{4} (I_i^2 + Q_i^2).$$

Step 506 is then performed. This step comprises obtaining the correlation function F(PN, s) for the first pilot. Control then passes to step 508, which comprises testing the energy of the strongest peak of the correlation function for the pilot, E(im), in relation to a threshold T1h, which is set to indicate when the initial integration time is sufficient to accurately estimate the desired parameters. (FIG. 6, to be discussed farther on, illustrates an example setting of this threshold).

If the energy of the strongest peak, E(im), exceeds the threshold T1h, step 510 is performed. In step 510, the position of the earliest peak within a predetermined interval of the strongest peak that is not a sidelobe is recorded. (This step returns the position of the strongest peak if an earlier peak within a predetermined interval of the strongest peak and distinguishable from a sidelobe is not detected.) The corresponding time of arrival, RMSE, and $E_c/I_0$ measurements for the pilot are also derived and recorded.

If the energy of the strongest peak, E(im) does not exceed the threshold T1h, control then passes to step 512. In step 512, the energy of the strongest peak E(im) is tested in relation to a threshold T1n, which is set at the lower limit of the dynamic range of the parameter estimator using the S1 search parameters.

If the energy of the strongest peak, E(im), exceeds the threshold T1n, control passes to step 514, where the pilot is added to a "deep" group, i.e., a group to be subjected to the greater integration time specified by S2 search parameters, with an indication that the pilot is to be subjected to a shortened search window (since a fix on the location of the strongest peak of the pilot has already been obtained).

If the energy of the strongest peak, E(im), does not exceed the threshold T1n, control then passes to step 516. In step 516, the pilot is added to the deep group, but the original window size is retained since the strongest peak for the pilot has heretofore been undetectable.

From steps 510, 514, and 516, control then passes to step 520. In step 520, it is determined whether there are additional pilots that remain to be tested. If so, control passes to step 522, where one of these remaining pilots is selected. Control then passes to step 508 for another iteration. If no more pilots remain to be tested, control then passes to step 522.

In step 522, one or more of the pilots added to the deep group are "searched" using S2 search parameters, i.e., a correlation function F(PN, s) is obtained for one or more of the pilots in the deep group using the integration time specified by the S2 search parameters. In one implementation, the S2 search parameters specify a coherent integration time of 2,048 chips, and a non-coherent integration time of 16. (However, other examples are possible, so this example should not be taken as limiting.) This means that each value of the correlation function F(PN, s) is determined by coherently (i.e., retaining phase information) integrating over sixteen successive groups of 2,048 complex samples each, and then non-coherently (i.e., not retaining phase information) combining the results for the sixteen groups. For example, if $I_1$, $Q_1$ represent the real and imaginary parts of the correlation value resulting from coherently integrating over the first 2,048 samples, $I_2$, $Q_2$ represent the real and imaginary parts of the correlation value resulting from coherently integrating over the next 2,048 samples, etc., the correlation value resulting from non-coherently combining these coherent integration results may be expressed as $$\sum_{i=1}^{16}(I_i^2+Q_i^2).$$

Note that step 522 need not be performed for all of the pilots in the deep group. In one implementation, step 522 is performed only in relation to those pilots which, in step 514, were added to the deep group and marked to be searched again with a shortened search window, and a subset of those pilots which, in step 516, were added to the deep group with the original window size retained.

From step 522, control passes to step 524. In step 524, one of the pilots searched in the previous step is selected. Control then passes to step 526. In step 526, the energy (Eim) of the strongest peak for the selected pilot is compared to two thresholds T2m and T2h, where T2m represents the upper limit of the dynamic range of the parameter estimator using the S2 search parameters and T2h is a threshold set to indicate when the existing results can be used to accurately estimate the desired parameters. (FIG. 6, to be discussed farther on, illustrates an example setting of these thresholds).

If the energy E(im) is less than T2m and greater than T2h, control passes to step 528. In step 528, the position of the earliest peak within a predetermined interval of the strongest peak that is not a sidelobe is recorded. (This step returns the position of the strongest peak if an earlier peak within a predetermined interval of the strongest peak which is distinguishable from a sidelobe cannot be detected). The time of arrival, RMSE, and $E_c/I_0$ measurements for the pilot are also derived and recorded.

If the energy E(im) is not between T2m and T2h, control passes to step 530, where the energy E(im) is tested in relation to two thresholds T2h and T2n. T2h was described previously, and T2n is set at the lower limit of the dynamic range of the parameter estimator using the S2 search parameters. (Again, FIG. 6, to be discussed farther on, illustrates an example setting of these thresholds).

If the energy E(im) is not between these two thresholds, control passes to step 532, where a peak not found indication is recorded.

If the energy E(im) is between these two parameters, control passes to step 538, where the pilot is re-searched, i.e., the correlation function for the pilot re-determined using the integration time specified by the S2 search parameters.

Step 540 is then performed. In step 540, the energy E(im) of the strongest peak resulting from the re-search is tested in relation to the thresholds T2m and T2n (which represent the upper and lower limits of the dynamic range of the parameter estimator resulting from the S2 search parameters). (FIG. 6, to be discussed farther on, illustrates an example setting of these thresholds).

If the energy E(im) is between these two thresholds and the change in position of the strongest peak from the old search to the new search, i.e., the value |P(im)−P(imold)|, is less than a predetermined window Wr (which in one non-limiting example is 4 chips), control passes back to step 528, where the position of the earliest peak within a predetermined interval of the strongest peak that is not a sidelobe is recorded. (Again, this step returns the position of the strongest peak if an earlier peak within a predetermined interval of the strongest peak and distinguishable from a sidelobe is not detected).

If, in step 540, the specified conditions are not met, control passes to step 532, where a peak not found indication is recorded.

From steps 528 and 532, control passes to step 534. In step 534, a determination is made whether any of the pilots that were searched in step 522 remain to be evaluated. If so, control passes to step 536, where one of these pilots is selected. Control then loops back to step 526, for another iteration. If no pilots remain, control passes to step 542, where the search cycle terminates.

Figure 6:
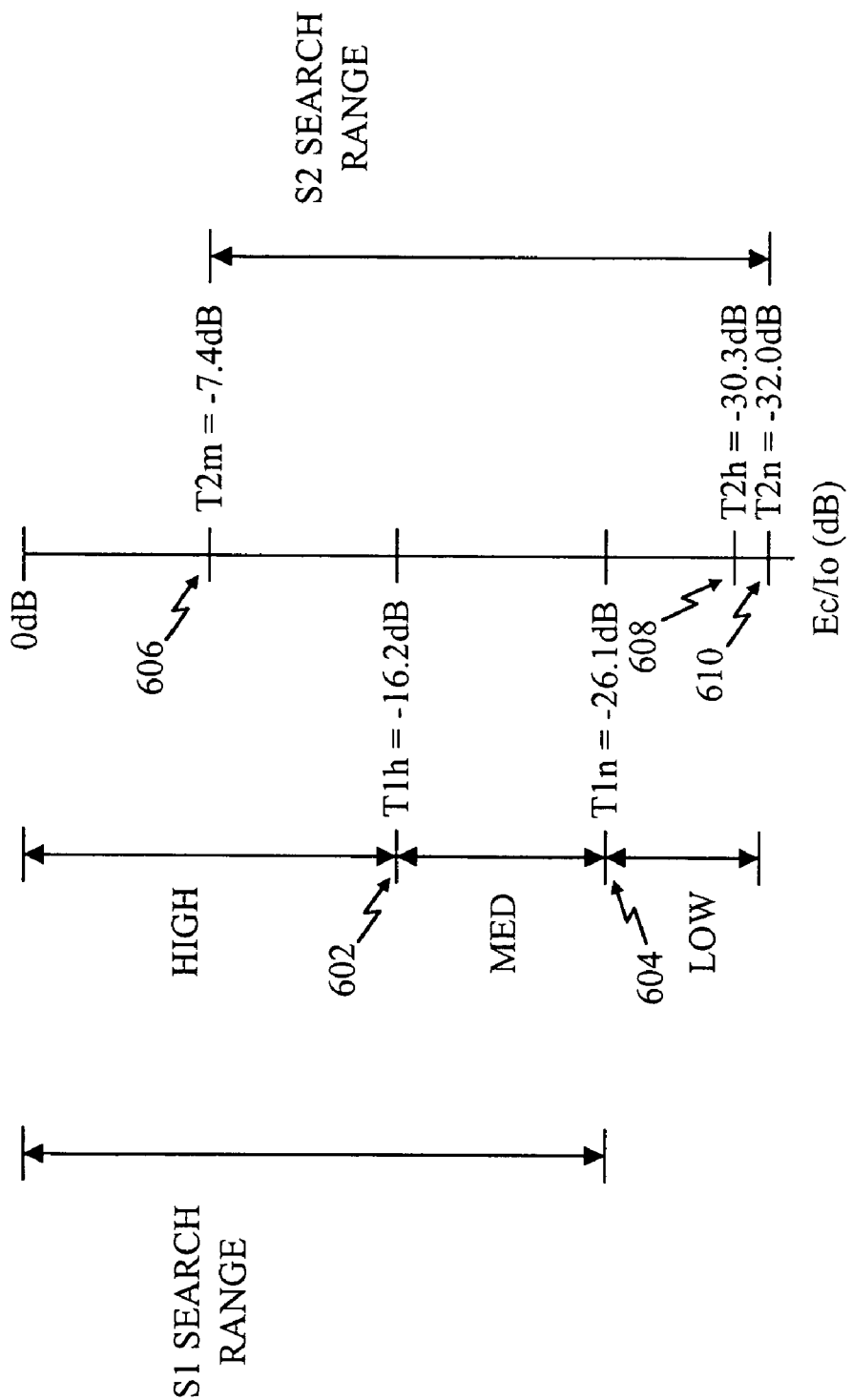
FIG. 6 is a diagram illustrating thresholds used in the example of FIG. 5.

Referring to FIG. 6, an example setting of the thresholds T1h, T1n, T2m, T2h, and T2n, is illustrated. The threshold T1h is set to indicate when an accurate estimate of the desired parameters can be made using the S1 search parameters; the threshold T1n is set at the lower limit of the dynamic range of the estimator using the S1 search parameters; the thresholds T2m and T2n are, respectively, the upper and lower limits of the dynamic range of the estimator using the S2 search parameters; and the threshold T2h is set to indicate when an accurate estimate of the desired parameters can be made using the S2 search parameters.

In particular, the dynamic range of the parameter estimator for the S1 search parameters ranges from an upper limit of 0 dB to a lower limit of −26.1 dB, while the dynamic range of the parameter estimator for the S2 search parameters ranges from an upper limit of −7.4 dB to a lower limit of −32.0 dB. The threshold T1h, identified with numeral 602, is set at −16.2 dB, while the threshold T1n, identified with numeral 604, is set at −26.1 dB, the lower limit of the dynamic range of the parameter estimator using the S1 search parameters. In addition, the threshold T2m, identified with numeral 606, is set at −7.4 dB, the upper limit of the dynamic range of the parameter estimator using the S2 search parameters. The threshold T2h, identified with numeral 608, is set at −30.3 dB, and the threshold T2n, identified with numeral 610, is set at −32.0 dB, the lower limit of the dynamic range of the parameter estimator using the S2 search parameters. Many other examples are possible, so this example should not be taken as limiting.

Figure 7:
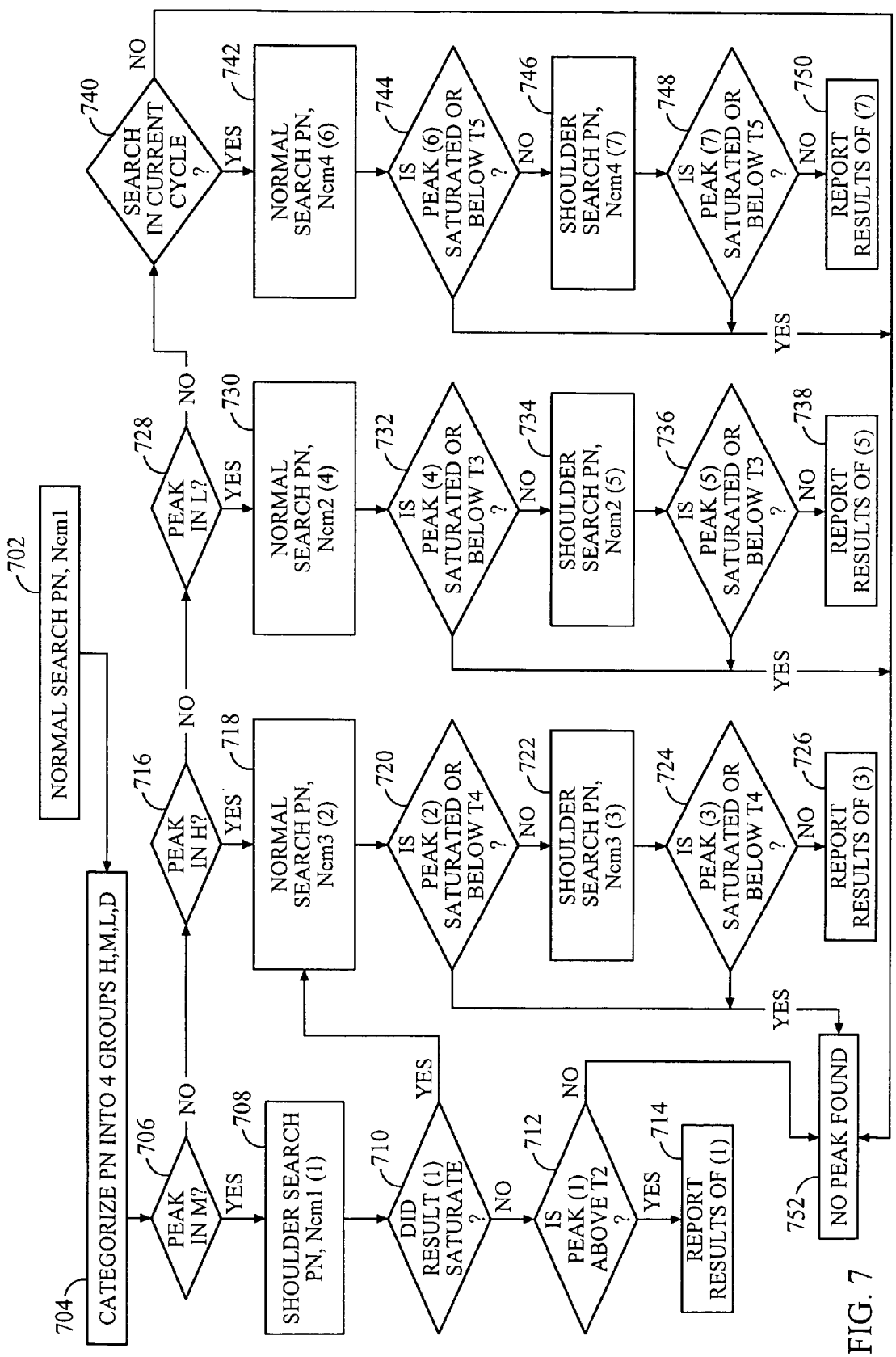
FIG. 7 is a flowchart of a second example of a method according to the invention of estimating a TOA parameter of a CDMA pilot signal using a dynamically variable integration time.

Referring to FIG. 7, a flowchart of a second example of a method of performing the search cycle step 406 in the method of FIG. 4 is illustrated. In step 702, a "normal" search is conducted of one of the PNs in a group comprising the neighbor list plus the active PN, i.e., the pilot with which the subscriber station is currently registered and in communication with. A "normal" search is a search for the all of the peaks of the pilot in order to determine the coarse time of arrival of the earliest peak that is not a sidelobe of the strongest peak (which is the strongest peak if an earlier peak distinguishable from a sidelobe of the strongest peak is not detected), and is to be contrasted with a "shoulder" search, i.e., a search for the precise time of arrival of the specific earliest peak determined from the "normal" search. This normal search is performed using the integration time specified by the Ncm1 search parameters. In one implementation, the Ncm1 search parameters specify a coherent integration time of 768 chips and a non-coherent integration time of 8, but it should be appreciated that other examples are possible.

Control then passes to step 704, where the results of the search are used to classify the pilot into one of four groups, a high (H) group, a medium (M) group, a low (L) group, and a deep (D) group. In one implementation, the pilot is classified within the H group if the peak for the pilot detected in step 702 saturated the estimator; the pilot is classified within the M group if the peak from step 702 is above a threshold T1 and did not saturate the estimator; the pilot is classified within the L group if the peak from step 702 is above a threshold T2 but below T1; and all other pilots are classified within the D group. (FIG. 9, described farther on, illustrates example settings of these thresholds.).

After step 704, control passes to step 706, where the peak for the pilot identified in step 702 is tested to determine if it is classified within the M group. If so, control passes to step 708, where a shoulder search is conducted using the integration time specified by the Ncm1 search parameters.

From step 708, control then passes to step 710. In step 710, the results of the search conducted in step 708 are evaluated to determine if they caused the estimator to saturate. If so, control passes to step 718 (to be discussed later). If not, control passes to step 712.

In step 712, the peak resulting from step 708 is tested to determine if it is above a threshold T2. (FIG. 9, described farther on, illustrates an example setting of this threshold.).

If the peak resulting from step 708 is above the threshold T2, control passes to step 714, where the position of the peak detected in step 708 is recorded along with corresponding measurements such as TOA, RMSE, and $E_c/I_0$. If the peak resulting from step 708 is not above the threshold T2, control passes to step 752, where an indication that no peak was found is recorded.

Turning back to step 706, if the peak detected for the pilot in step 702 is not classified within the M group, control passes to step 716, where it is determined whether the peak is classified within the H group. If so, control passes to step 718, where a normal search of the pilot is conducted using the integration time specified by the Ncm3 search parameters. In one implementation, the Ncm3 search parameters specify a coherent integration time of 512 chips, and a non-coherent integration time of 2. However, it should be appreciated that other examples are possible, so this example should not be taken as limiting.

From step 718, control passes to step 720. In step 720, the peak resulting from step 718 is tested to determine if it resulted in saturation of the estimator or is below a threshold T4. (FIG. 9, described farther on, illustrates an example setting of this threshold.).

If the peak resulting from step 718 resulted in saturation of the estimator or is below the threshold T4, control passes to step 752, where a peak not found indication is recorded. Otherwise, control passes to step 722, where a shoulder search of the pilot is conducted using the integration time specified by the Ncm3 search parameters.

Control then passes to step 724, where the peak resulting from step 722 is tested to determine if it resulted in saturation of the estimator or is below the T4 threshold. If either of these conditions are met, control passes to step 752, where a peak not found indication is recorded. If both are unmet, control passes to step 726, where the position of the peak found in step 722 is recorded along with corresponding TOA, RMSE, and $E_c/I_0$ measurements.

Turning back to step 716, if the peak identified for the pilot in step 702 is not classified in the H group, control passes to step 728, where it is determined whether it is classified in the L group. If so, control passes to step 730, where a normal search of the pilot is performed using an integration time as specified in the Ncm2 search parameters. In one implementation, the Ncm2 search parameters specify a coherent integration time of 1,024 chips and a non-coherent integration time of 16, but it should be appreciated that other examples are possible, so this example should not be taken as limiting.

From step 730, control passes to step 732. In step 732, the peak resulting from step 730 is analyzed to determine if it resulted in saturation of the estimator, or is below a threshold T3. In one implementation, the threshold T3 is −29 dB, but it should be appreciated that other examples are possible, so this example should not be taken as limiting.

If the peak resulting from step 730 results in saturation of the estimator or is below the T3 threshold, control passes to step 752, where a peak not found indication is recorded. If neither of these conditions are satisfied, control passes to step 734, where a shoulder search of the pilot is conducted using the integration time specified by the Ncm2 search parameters.

Step 736 is then performed. In step 736, a determination is made whether the peak resulting from step 734 resulted in saturation of the estimator or is below the T3 threshold. If so, control passes to step 752, where a peak not found indication is recorded. If not, control passes to step 738, where the position of the peak found in step 736 is recorded along with corresponding TOA, RMSE, and $E_c/I_0$ measurements.

Turning back to step 728, if the peak resulting from the search conducted in step 702 is not classified in the L group, control passes to step 740. In step 740, a determination is made whether there is still time in the current search cycle. If not, control passes to step 752, where a peak not found indication is recorded.

This step recognizes that, because of the long dwell times required for the pilots that are in the D group, it may not be possible to perform a search of all the pilots in this group within the current search cycle. Therefore, this step checks the time remaining in the current search cycle to determine if it can accommodate a search of the pilot. If insufficient time is available, a peak not found indication is recorded for the pilot, while, if sufficient time remains, the pilot is searched. In one alternative to this step, in order to allow limits to be placed on the length of the search cycle, only a predetermined number, e.g., 4, of the pilots in the D group are searched during a search cycle.

Assuming there is still time remaining in the current search cycle or the pilot is one of the members of the D group which is selected to be searched during the current search cycle, control passes to step 742. There, a normal search of the pilot is conducted using the integration time specified by the Ncm4 search parameters. In one implementation, the Ncm4 search parameters specify a coherent integration time of 2,048 chips and a non-coherent integration time of 16, but it should be appreciated that other examples are possible, so this example should not be taken as limiting.

From step 742, control passes to step 744, where it is determined whether the peak resulting from step 742 results in saturation of the estimator or is below a threshold T5. (FIG.

9, described farther on, illustrates an example setting of this threshold.). If either of these conditions are met, control passes to step 752, where a peak not found indication is recorded. If both are unmet, control passes to step 746, where a shoulder search of the pilot is performed using the integration time specified by the Ncm4 search parameters.

From step 746, step 748 is performed. In step 748, it is determined whether the peak resulting from step 748 results in saturation of the estimator or is below the T5 threshold. If either of these conditions are met, control passes to step 752, where a peak not found indication is recorded. If both are unmet, the position of the peak resulting from step 748 is recorded, as well as corresponding TOA, RMSE, and $E_c/I_0$ measurements.

The process of FIG. 7 may continue to iterate for each of the pilots in the group comprising the neighbor list and the active pilot.

Figure 9:
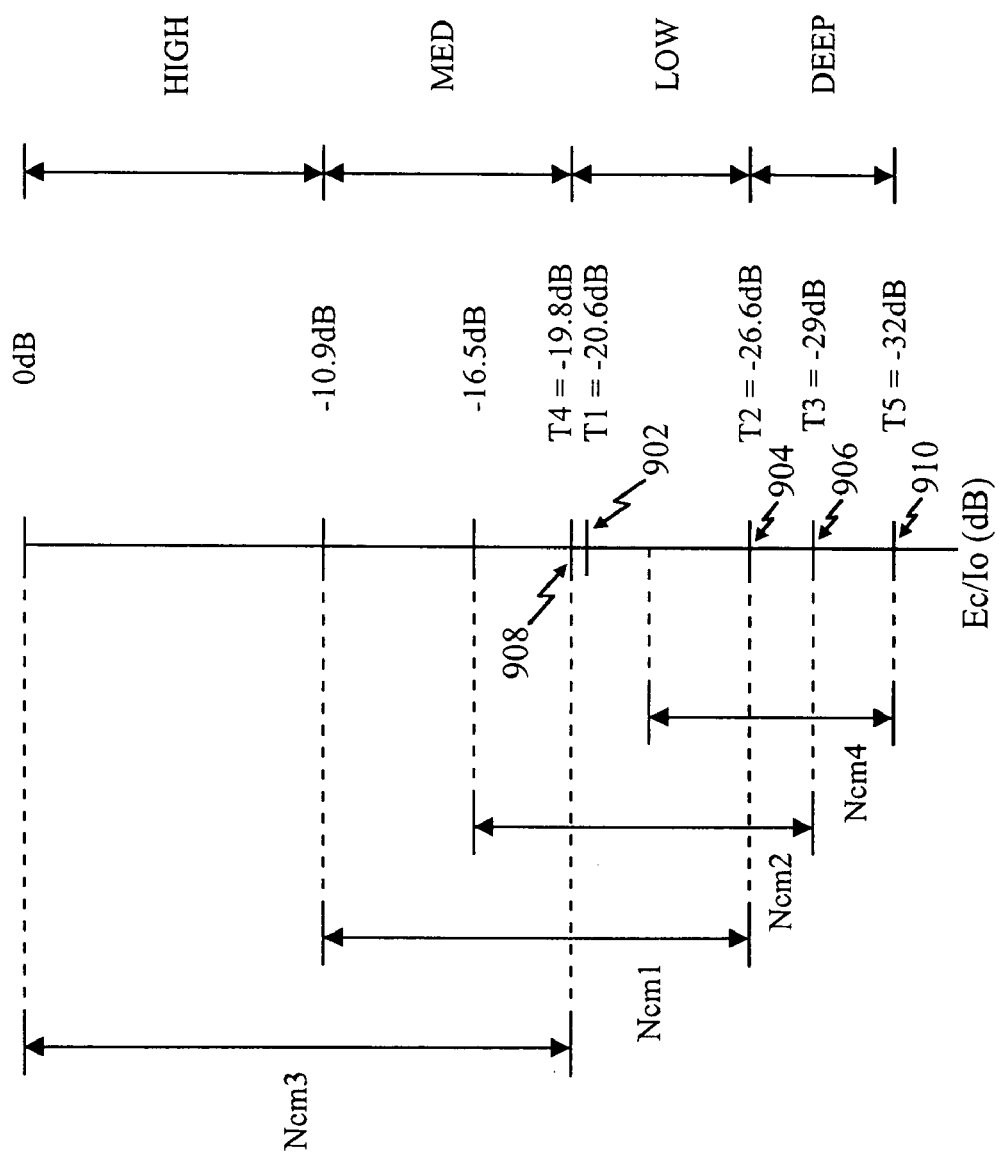
FIG. 9 is a diagram illustrating thresholds used in the example of FIG. 7.

Referring to FIG. 9, an example setting of the thresholds T1, T2, T3, T4, and T5 is illustrated. The threshold T1, identified with numeral 902, marks the boundary between the L and M groups; the threshold T2, identified with numeral 904, marks the boundary between the L and D groups, and is set to indicate when the parameter estimate(s) are accurate using the Ncm1 search parameters; the threshold T3, identified with numeral 906, is set to indicate when the parameter estimate(s) are accurate using the Ncm2 search parameters; the threshold T4, identified with numeral 908, is set to indicate when parameter estimate(s) are accurate using the Ncm3 search parameters; and the threshold T5, identified with numeral 910, is set to indicate when the parameter estimate(s) are accurate using the Ncm4 search parameters.

In particular, in the example illustrated, the threshold T1 is set to −20.6 dB; the threshold T2 is set to −26.6 dB; the threshold T3 is set to −29 dB; the threshold T4 is set to −19.8 dB; and the threshold T5 is set to −32 dB. However, it should be appreciated that other examples are possible, so that this example should not be construed as limiting.

Comparing the methods of FIGS. 5 and 7, it can be seen that the method of FIG. 5 involves limiting false alarm probabilities through the use of appropriately set thresholds, while that of FIG. 7 uses thresholds as well as a double detection criterion, whereby a pilot is subjected to both normal and shoulder searches, to avoid false alarms.

Any of the foregoing methods may be tangibly embodied in a variety of forms, including but not limited to, a form where a series of instructions embodying the method is stored on a processor readable medium or a server in a computer network such as the Internet, where the method is embodied as synthesized logic, or where the method is embodied as a computer program product, i.e., a code segment or module.

While various embodiments of the invention have been described, it will be apparent to those of ordinary skill in the art that many more embodiments and implementations are possible that are within the scope of this invention.

What is claimed is:

1. A parameter estimator comprising:
   correlation logic for determining, using a dynamically variable integration time, a correlation function representing the correlation between a signal and one or more shifted versions of an identification code; and
   analysis logic for analyzing the correlation function and estimating, responsive thereto, one or more parameter(s) other than the identification code relating to the signal.

2. The parameter estimator of claim 1 configured to first attempt to estimate the one or more parameter(s) from a correlation function derived using a first integration time, and, if unsuccessful, estimate the one or more parameter(s) from a correlation function derived using a second integration time which may differ from the first.

3. The parameter estimator of claim 2 wherein the second integration time is of shorter duration than the first.

4. The parameter estimator of claim 2 wherein the second integration time is of longer duration than the first.

5. The parameter estimator of claim 1 configured to determine an integration time from an analysis of a correlation function derived from the signal using a default integration time.

6. The parameter estimator of claim 1 configured to estimate one or more parameter(s) relating to a first signal from a correlation function derived from the first signal using a first integration time, and to estimate one or more parameter(s) relating to a second signal from a correlation function derived from the second signal using a second integration time which may differ from the first.

7. A parameter estimator comprising:
   correlation means for determining, using a dynamically variable integration time, a correlation function representing the correlation between a signal and one or more shifted versions of an identification code; and
   analysis means for analyzing the correlation function and estimating, responsive thereto, one or more parameter(s) other than the identification code relating to the signal.

8. A method of estimating one or more parameter(s) of a signal using a dynamically variable integration time comprising:
   determining, using a first integration time, a first correlation function representing the correlation between a first signal and one or more shifted versions of a first identification code;
   estimating, responsive to the first correlation function, one or more parameter(s) relating to the first signal;
   determining, using a second integration time which may differ from the first integration time, a second correlation function representing the correlation between a second signal and one or more shifted versions of a second identification code; and
   estimating, responsive to the second correlation function, one or more parameter(s) other than the identification code relating to the second signal.

9. The method of claim 8 wherein the first and second signals are pilot signals.

10. The method of claim 8 wherein the first and second identification codes are pseudo-noise codes.

11. The method of claim 8 wherein the second integration time is of shorter duration than the first integration time.

12. The method of claim 8 wherein the second integration time is of longer duration that the first integration time 13. The method of claim 8 wherein the one or more parameter(s) relating to either signal include a time of arrival (TOA) parameter.

14. The method of claim 13 wherein the one or more parameter(s) for either signal include a root mean squared error (RMSE) for the TOA parameter.

15. The method of claim 8 wherein the one or more parameter(s) for either signal include an energy per chip divided by total interference power density parameter.

16. A method of estimating one or more parameter(s) of a signal using a dynamically variable integration time comprising:
   determining, using a first integration time, a first correlation function representing the correlation between a signal and one or more shifted versions of an identification code;
   attempting to estimate, responsive to the first correlation function, one or more parameter(s) other than the identification code relating to the signal; and if the attempt is unsuccessful:
  determining, using a second integration time which may differ from the first integration time, a second correlation function representing the correlation between the signal and one or more shifted versions of the identification code; and
  attempting to estimate, responsive to the second correlation function, the one or more parameter(s) other than the identification code relating to the signal.

17. The method of claim 16 wherein the signal is a pilot signal.

18. The method of claim 16 wherein the identification code is a pseudo-noise code.

19. The method of claim 16 wherein the second integration time is of shorter duration than the first integration time.

20. The method of claim 16 wherein the second integration time is of longer duration than the first integration time.

21. The method of claim 16 wherein the one or more parameter(s) include a time of arrival (TOA) parameter for the signal.

22. The method of claim 21 wherein the one or more parameter(s) include a root mean squared error (RMSE) for the TOA parameter.

23. The method of claim 16 wherein the one or more parameter(s) include an energy per chip divided by total interference power density parameter relating to the signal.

24. The method of claim 16 further comprising iterating until the one or more parameter(s) are estimated, or it is determined that the one or more parameter(s) cannot be estimated from the signal.

25. A method of estimating one or more parameter(s) relating to signal using a dynamically variable integration time comprising:
  determining, using a first integration time, a first correlation function representing the correlation between a signal and an identification code;
  determining, responsive to the first correlation function, a second integration time which may differ from the first integration time;
  determining, using the second integration time, a second correlation function representing the correlation between the signal and the identification code; and
  attempting to estimate, responsive to the second correlation function, one or more parameter(s) relating to the signal.

26. The method of claim 25 wherein the signal is a pilot signal.

27. The method of claim 25 wherein the identification code is a pseudo-noise code.

28. The method of claim 25 wherein the second integration time is of shorter duration than the first.

29. The method of claim 25 wherein the second integration time is of longer duration than the first.

30. The method of claim 25 wherein the one or more parameter(s) include a time of arrival (TOA) parameter.

31. The method of claim 30 wherein the one or more parameter(s) include root mean squared error (RMSE) for the TOA parameter.

32. The method of claim 25 wherein the one or more parameter(s) include an energy per chip divided by total interference power density parameter.

33. The method of claim 25 further comprising iterating until the one or more parameter(s) are estimated, or it is determined that the one or more parameter(s) cannot be estimated from the signal.

34. A method of estimating one or more parameter(s) of a signal using a dynamically variable integration time comprising:
  a step for determining, using a first integration time, a first correlation function representing the correlation between a first signal and one or more shifted versions of a first identification code;
  a step for estimating, responsive to the first correlation function, one or more parameter(s) other than the identification code relating to the first signal;
  a step for determining, using a second integration time which may differ from the first integration time, a second correlation function representing the correlation between a second signal and one or more shifted versions of a second identification code; and
  a step for estimating, responsive to the second correlation function, one or more parameter(s) other than the identification code relating to the second signal.

35. A method of estimating one or more parameters of a signal using a dynamically variable integration time comprising:
  a step for determining, using a first integration time, a first correlation function representing the correlation between a signal and one or more shifted versions of an identification code;
  a step for attempting to estimate, responsive to the first correlation function, one or more parameter(s) other than the identification code relating to the signal; and
  if the attempt is unsuccessful:
  a step for determining, using a second integration time which may differ from the first integration time, a second correlation function representing the correlation between the signal and one or more shifted versions of the identification code; and
  a step for attempting to estimate, responsive to the second correlation function, the one or more parameter(s) other than the identification code relating to the signal.

36. A method of estimating one or more parameter(s) relating to signal using a dynamically variable integration time comprising:
  a step for determining, using a first integration time, a first correlation function representing the correlation between a signal and an identification code
  a step for determining, responsive to the first correlation function, a second integration time which may differ from the first integration time;
  a step for determining, using the second integration time, a second correlation function representing the correlation between the signal and the identification code; and
  a step for attempting to estimating, responsive to the second correlation function, one or more parameter(s) relating to the signal.

37. The methods of any of claims 8, 16, 25, 34, 35, or 36, tangibly embodied as a series of processor executable instructions stored in a processor readable medium.

38. The methods of any of claims 8, 16, 25, 34, 35, or 36, tangibly embodied as a series of computer executable instructions stored on a server.

39. A synthesized logic circuit embodying the steps of any of the methods of claims 8, 16, 25, 34, 35, or 36.

* * * * *